UNITED STATES PATENT OFFICE.

CHARLES J. STROSACKER, OF MIDLAND, MICHIGAN, ASSIGNOR TO THE DOW CHEMICAL COMPANY, OF MIDLAND, MICHIGAN, A CORPORATION OF MICHIGAN.

PROCESS OF MAKING CARBON TETRACHLORID.

1,204,608.      Specification of Letters Patent.    Patented Nov. 14, 1916.

No Drawing.     Application filed February 13, 1915. Serial No. 8,117.

*To all whom it may concern:*

Be it known that I, CHARLES J. STROSACKER, a citizen of the United States, residing at Midland, in the county of Midland and State of Michigan, have invented a certain new and useful Improvement in Processes of Making Carbon Tetrachlorid, of which the following is a full, clear and exact description.

This invention relates to an improvement in the process of making carbon tetrachlorid, and is especially designed as an improvement in that general method of making carbon tetrachlorid in which sulfur chlorid is caused to react upon carbon disulfid. The result of this reaction is the production of carbon tetrachlorid, free sulfur, and sulfur monochlorid. A necessary step in these processes has been the elimination of the sulfur from the process liquors, which has been effected in the following manner in all processes with which I am familiar: Sulfur chlorid and carbon disulfid are caused to react in a suitable still at a temperature such that the volatile products, namely, carbon tetrachlorid, together with some undecomposed carbon disulfid and sulfur chlorid, are distilled off and condensed. The amount of carbon disulfid used is less than enough to convert all of the sulfur chlorid, wherefore a still-residue is obtained consisting of a hot saturated solution of sulfur in sulfur monochlorid. This hot solution is then withdrawn from the still and run into a cooling tank provided with a stirrer and therein cooled and the sulfur crystallized. The product from this step is a mass of granular sulfur crystals wet with a mass of sulfur monochlorid. This mixture is then run onto a filter and drained, the sulfur monochlorid being returned to the process and the sulfur reclaimed by removal from the filter. The sulfur obtained in this manner must either be washed in water to decompose and remove the remaining sulfur monochlorid with which the crystals are wet, or must be melted down and the sulfur monochlorid volatilized and driven off in the form of vapors which must be thereafter condensed. This entire proceeding is attended with no inconsiderable loss and great difficulty because of the extremely noxious fumes evolved. Furthermore this method requires, not only the stills, columns, and condensers for accomplishing the reaction, fractionation, and condensation of the distillates, but also the cooling and crystallizing tank and the filter, both of suitable construction and equipped with suitable pumps and connections, together with a quenching tank for crystals and an exhauster and scrubber to absorb fumes; or in place of the tank, a melting box provided with an exhauster, a scrubber, and a condenser to reclaim the sulfur monochlorid.

The present improvement relates to the elimination of the sulfur, the preferred procedure being as follows: Instead of stopping the addition of carbon disulfid when the still-residue has become a hot, saturated solution of sulfur in sulfur monochlorid, the addition of carbon disulfid is slowly continued and the temperature of the still is meanwhile raised somewhat and maintained at such a point that the residue will not solidify. I find that under such conditions the evolution of carbon tetrachlorid can be continued until practically all of the sulfur monochlorid has been disposed of, the carbon disulfid reacting upon that monochlorid notwithstanding the presence of free sulfur in solution. By maintaining a high temperature in the still, as above mentioned, and continuing the addition of carbon disulfid, there may be obtained a final residue in the still consisting of molten sulfur practically free from carbon disulfid and carbon tetrachlorid, and also nearly free from chlorin. When this point has been reached, the residue is drawn off into molds or into water and therein solidified, whereupon it is in shape for other commercial or technical use practically without refining or further operation and almost wholly without the evolution of the noxious and disgusting odors inseparable from the other process.

This improved method, while requiring the same stills, fractionating columns, and condensers as the process outlined above (these being employed for the production and condensation of the carbon tetrachlorid) does not require any crystallizing tank, pump, exhauster, scrubber, and filter, and the various connections and valves heretofore necessarily employed for the elimination and reclamation of the sulfur, all of which pieces of apparatus are expensive in construction and difficult in operation.

In the practical operation of my improved process it is ordinarily most convenient first to charge the still with sulfur dichlorid, then to add the carbon disulfid in the usual manner so as to carry the reaction to a point where the still-residue consists of a hot solution of sulfur in sulfur monochlorid. More sulfur dichlorid is then added and the addition of carbon disulfid resumed and the reaction again carried to the same point. Even a third charge might profitably be worked in the same way before a sufficiently large residue would be made to justify the complete conversion of the remaining sulfur monochlorid into carbon tetrachlorid, in the method heretofore described. However, as soon as a sufficiently large residue is obtained in the still, the temperature is slowly raised and the addition of carbon disulfid continued so as to reduce the sulfur monochlorid still remaining to the point where practically pure sulfur is left. In other words, the still may be worked for two or more charges by the old method before the final elimination of the sulfur by means of the improved method. It is obvious, however, that the still could be run entirely clean and the molten sulfur withdrawn at each charge if desired.

Having thus described my invention, what I claim is:

1. The process of making carbon tetrachlorid which consists in the addition of carbon disulfid to a charge of sulfur dichlorid and the removal and condensation of the evolved carbon tetrachlorid until the sulfur dichlorid has been reduced substantially to sulfur monochlorid, and thereafter increasing the temperature and continuing the addition of carbon disulfid and the removal and condensation of carbon tetrachlorid until the said sulfur monochlorid has largely been reduced to sulfur.

2. In the process of making carbon tetrachlorid from sulfur dichlorid and carbon disulfid, the step which consists in continuing the addition of carbon disulfid to the reaction vessel after the reduction of the first charge of sulfur dichlorid to sulfur monochlorid, whereby the still-residue may be reduced approximately to sulfur dissolved in a comparatively small quantity of sulfur chlorids.

3. In a process of making carbon tetrachlorid from sulfur chlorid and carbon disulfid, the step which consists in eliminating the sulfur by continuing the addition of carbon disulfid to the charge and the removal and condensation of the carbon tetrachlorid until a residue of molten sulfur is obtained substantially free from sulfur chlorids, the temperature of the residue being maintained above the point of solidification.

4. In a process of making carbon tetrachlorid from sulfur chlorid and carbon disulfid, the steps which consist in eliminating the sulfur by continuing the addition of carbon disulfid to the charge and the removal and condensation of the carbon tetrachlorid until a residue of molten sulfur is obtained substantially free from sulfur chlorids, the temperature of the residue being maintained above the point of solidification, and then withdrawing said residue from the reaction vessel.

5. The process of making carbon tetrachlorid from sulfur chlorid and carbon disulfid which consists in adding the carbon disulfid to a charge of sulfur dichlorid contained in a suitable vessel until the still-residue consists principally of a hot solution of sulfur in sulfur monochlorid, adding a further quantity of sulfur dichlorid and continuing the addition of carbon disulfid until the reaction again reaches the same point, and finally raising the temperature and continuing the addition of carbon disulfid until such sulfur monochlorid is largely reduced.

In testimony whereof, I hereunto affix my signature in the presence of two witnesses.

CHARLES J. STROSACKER.

Witnesses:
C. E. BARNES,
THOS. GRISWOLD, Jr.